(12) United States Patent
Breddermann et al.

(10) Patent No.: US 11,921,188 B2
(45) Date of Patent: Mar. 5, 2024

(54) METHOD FOR DETERMINING DIRECTION INFORMATION

(71) Applicant: HELLA GmbH & Co. KGaA, Lippstadt (DE)

(72) Inventors: Tobias Breddermann, Lippstadt (DE); Andreas Von Rhein, Salzkotten (DE); Christian Westhues, Hamm (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 278 days.

(21) Appl. No.: 17/204,783

(22) Filed: Mar. 17, 2021

(65) Prior Publication Data

US 2021/0293949 A1   Sep. 23, 2021

(30) Foreign Application Priority Data

Mar. 17, 2020 (DE) ...................... 10 2020 107 222.8

(51) Int. Cl.
| | |
|---|---|
| *G01S 13/58* | (2006.01) |
| *G01S 7/28* | (2006.01) |
| *G01S 7/282* | (2006.01) |
| *G01S 7/292* | (2006.01) |
| *G01S 13/42* | (2006.01) |
| *G01S 13/524* | (2006.01) |
| *G01S 13/87* | (2006.01) |

(52) U.S. Cl.
CPC .......... *G01S 13/584* (2013.01); *G01S 7/2806* (2013.01); *G01S 7/282* (2013.01); *G01S 7/2923* (2013.01); *G01S 13/42* (2013.01); *G01S 13/5242* (2013.01); *G01S 13/878* (2013.01)

(58) Field of Classification Search
CPC ...... G01S 13/931; G01S 13/584; G01S 7/354; G01S 7/2806; G01S 7/2923
USPC ................................................... 342/109, 107
See application file for complete search history.

(56) References Cited

U.S. PATENT DOCUMENTS

| | | | | |
|---|---|---|---|---|
| 4,646,093 A | * | 2/1987 | Postema | ............. G01S 13/4436 342/174 |
| 5,388,461 A | * | 2/1995 | Rigby | ................ G01S 15/8918 600/442 |

(Continued)

FOREIGN PATENT DOCUMENTS

WO   WO2018071077 A2   4/2018

*Primary Examiner* — Vladimir Magloire
*Assistant Examiner* — Michael W Justice
(74) *Attorney, Agent, or Firm* — Muncy, Geissler, Olds & Lowe , P.C.

(57) ABSTRACT

A method for determining direction information for at least one target object in a radar system for a vehicle. The first detection information is provided by at least two receive antennas of the radar system, wherein the first detection information is specific for a first radar signal transmitted by a first transmit antenna of the radar system. The second detection information is provided by the at least two receive antennas of the radar system, wherein the second detection information is specific for a second radar signal transmitted by a second transmit antenna of the radar system. A first angle determination and a second angle determination are performed. At least one comparison of the first angle information with the second angle information is performed in order to detect an ambiguity in the first angle determination for the determination of the direction information.

17 Claims, 5 Drawing Sheets

(56) References Cited

U.S. PATENT DOCUMENTS

| | | | | |
|---|---|---|---|---|
| 6,489,923 | B1* | 12/2002 | Bevan | H01Q 1/246 342/378 |
| 6,778,130 | B1* | 8/2004 | Bevan | H01Q 1/246 342/174 |
| 8,576,664 | B2* | 11/2013 | Kasano | G01S 13/589 342/99 |
| 8,994,581 | B1* | 3/2015 | Brown | G01S 13/931 342/149 |
| 9,250,319 | B2* | 2/2016 | Van Der Merwe | H01Q 19/06 |
| 9,400,325 | B2* | 7/2016 | Millar | G01S 7/42 |
| 9,541,638 | B2* | 1/2017 | Jansen | G01S 13/878 |
| 9,618,616 | B2* | 4/2017 | Kishigami | G01S 7/40 |
| 9,689,983 | B2* | 6/2017 | Cao | G01S 13/42 |
| 10,126,409 | B2* | 11/2018 | Loesch | G01S 13/42 |
| 10,359,512 | B1* | 7/2019 | Hong | G01S 13/878 |
| 10,386,462 | B1* | 8/2019 | Hong | G01S 13/46 |
| 10,416,299 | B2* | 9/2019 | Schoor | G01S 13/0209 |
| 10,539,645 | B2* | 1/2020 | Bialer | G01S 3/50 |
| 10,557,931 | B2* | 2/2020 | Schoor | G01S 13/584 |
| 10,627,483 | B2 | 4/2020 | Rao et al. | |
| 10,634,775 | B2* | 4/2020 | Loesch | G01S 13/003 |
| 11,009,598 | B2* | 5/2021 | Dobrev | G01S 13/87 |
| 11,119,185 | B2* | 9/2021 | Barkan | G01S 13/522 |
| 11,320,510 | B2* | 5/2022 | Levy-Israel | G01S 7/03 |
| 11,346,933 | B2* | 5/2022 | Panzer | G01S 13/931 |
| 11,360,204 | B2* | 6/2022 | Hakobyan | G01S 13/325 |
| 11,448,725 | B2* | 9/2022 | Iwasa | G01S 13/0218 |
| 11,567,183 | B2* | 1/2023 | Wang | G01S 13/505 |
| 2005/0179579 | A1* | 8/2005 | Pinder | G01S 7/2926 342/25 R |
| 2010/0052972 | A1* | 3/2010 | Kasano | G01S 13/56 342/28 |
| 2010/0123616 | A1* | 5/2010 | Minami | H01Q 21/08 342/147 |
| 2013/0194128 | A1* | 8/2013 | Van Der Merwe | G01S 13/582 342/107 |
| 2015/0070207 | A1* | 3/2015 | Millar | G01S 13/4454 342/174 |
| 2015/0247924 | A1* | 9/2015 | Kishigami | G01S 7/411 342/146 |
| 2016/0097847 | A1* | 4/2016 | Loesch | G01S 13/931 342/156 |
| 2016/0131752 | A1* | 5/2016 | Jansen | G01S 13/42 342/27 |
| 2016/0146925 | A1* | 5/2016 | Millar | H04B 7/0822 342/113 |
| 2016/0284213 | A1* | 9/2016 | Cao | G01S 13/584 |
| 2017/0131392 | A1* | 5/2017 | Schoor | G01S 13/42 |
| 2017/0131393 | A1* | 5/2017 | Schoor | G01S 13/42 |
| 2017/0212205 | A1* | 7/2017 | Bialer | G01S 3/50 |
| 2017/0307744 | A1* | 10/2017 | Loesch | H01Q 21/296 |
| 2017/0343650 | A1* | 11/2017 | Kanemaru | G01S 13/42 |
| 2018/0172813 | A1* | 6/2018 | Rao | G01S 13/343 |
| 2019/0107614 | A1* | 4/2019 | Dobrev | G01S 7/352 |
| 2019/0377062 | A1* | 12/2019 | Barkan | G01S 13/536 |
| 2020/0049812 | A1 | 2/2020 | Jansen | |
| 2020/0081110 | A1* | 3/2020 | Nam | G01S 13/343 |
| 2020/0103495 | A1* | 4/2020 | Iwasa | G01S 13/325 |
| 2020/0132812 | A1* | 4/2020 | Dvorecki | G01S 13/931 |
| 2020/0158861 | A1* | 5/2020 | Cattle | G01S 13/89 |
| 2020/0182991 | A1* | 6/2020 | Hakobyan | H04B 7/0413 |
| 2020/0209352 | A1 | 7/2020 | Rao et al. | |
| 2021/0025961 | A1* | 1/2021 | Levy-Israel | G01S 7/03 |
| 2021/0026003 | A1* | 1/2021 | Panzer | G01S 13/931 |
| 2021/0318424 | A1* | 10/2021 | Wang | G01S 7/41 |
| 2022/0137179 | A1* | 5/2022 | Gao | G01S 7/003 342/195 |
| 2022/0221569 | A1* | 7/2022 | Wang | G01S 13/58 |

\* cited by examiner

METHOD FOR DETERMINING DIRECTION INFORMATION

This nonprovisional application claims priority under 35 U.S.C. § 119(a) to German Patent Application No. 102020107222.8, which was filed in Germany on Mar. 17, 2020 and which is herein incorporated by reference.

BACKGROUND OF THE INVENTION

Field of the Invention

The present invention relates to a method for determining direction information in a radar system. The invention relates further to a radar system and a computer program for determining direction information.

Description of the Background Art

It is known from the state of the art to use radar systems, such as modulated continuous-wave radar devices, also referred to as FMCW radar (frequency-modulated continuous-wave radar), in vehicles for object detection. As emerges, for example, from the document WO 2018/071077 A2, it is possible with such radar systems to use multiple transmit and receive antennas in order to determine direction information in addition to information about a distance and relative velocity to a detected object. The terms MIMO or SIMO transmission scheme and signal processing are also used in this context. If radar signals are transmitted over different transmit antennas of the radar system, a different transit time of these radar signals results when they are reflected on the object and reach the receive antenna. The transit time difference—and thus a phase difference of the radar signals—depends on a distance of the transmit antennas to one another. An evaluation of the phase difference can contribute to determining the angle of arrival or reflection at the receive and transmit antennas and thus to determining the direction information about the direction of the object relative to the vehicle.

If the radar signals are not transmitted via the different transmit antennas simultaneously but one after the other in time, the difference in transit time (and thus the phase difference) can also be influenced on the basis of a relative velocity between the object and the vehicle. In order to nevertheless obtain a phase difference specific to the direction information, the phase difference can be compensated as a function of the relative velocity. However, a further problem here is that if the relative velocity exceeds a maximum velocity, the relative velocity is no longer determined unambiguously and the wrong compensation value is used for this compensation. This results in an ambiguity in the determination of the angle, specifically in an ambiguity in the relative velocity. The maximum velocity is a function of the radar system resolving power.

SUMMARY OF THE INVENTION

It is therefore an object of the present invention to overcome at least partially the above-described disadvantages. In particular, it is the object of the present invention to propose an improved solution for compensating for the influencing the phase difference by the relative velocity.

In this regard, features and details that are described in relation to the method of the invention also apply, of course, in relation to the radar system of the invention and to the computer program of the invention, and conversely in each case, so that with regard to the disclosure, reference is or can always be made mutually to the individual aspects of the invention.

The object is achieved in particular by a method for determining direction information for at least one target object in a radar system for a vehicle. The direction information for the target object can be understood in this case as information about the direction of the target object relative to the radar system or vehicle. For example, this information includes an indication of an angle between the radar system and the target object. Conclusions about this direction information can thus be obtained by determining an angle of arrival and/or reflection of radar signals of the radar system.

It is therefore provided in the method of the invention that the following steps are performed, preferably one after the other or in any order, wherein individual and/or all steps can also be performed repeatedly: providing the first detection information by at least two (different and spaced apart) receive antennas of the radar system, wherein the first detection information is preferably specific for a first radar signal transmitted by a first transmit antenna of the radar system and, in particular, reflected on the target object and delayed by a transit time; providing the second detection information by the at least two receive antennas of the radar system, wherein the second detection information is preferably specific for a second radar signal transmitted by a second transmit antenna of the radar system and, in particular, reflected on the target object and delayed by a transit time; performing a first angle determination from the first and second detection information in order to determine a first angle information therefrom, so that the first angle information is specific for the first and second radar signal, in particular in accordance with MIMO; performing a second angle determination from the first or second detection information in order to determine a second angle information therefrom, so that the second angle information is specific for one of the (first or second transmitted) radar signals, in particular in accordance with SIMO; and performing at least one comparison of the first with the second angle information in order to detect an ambiguity in the first angle determination for the determination of direction information.

The ambiguity can be an ambiguity in the determination of a (measured) relative velocity of the target object (hereinafter also referred to as velocity ambiguity for short). This determination of the relative velocity can be made possible by processing the detection information. The ambiguity can be due to the limited radar system resolving power, as already described above. Because the actual relative velocity of the target object can influence a phase difference between the first and second (transmitted, reflected, and received) radar signal if the second radar signal is transmitted later than the first radar signal, the measured relative velocity can be used to compensate for this influence. Because the measured relative velocity may be ambiguous, this can lead to errors in the compensation. Performing the second angle determination and the subsequent comparison can, however, verify the compensation and, if necessary, correct it.

It is conceivable that in the radar system at least one of the angle determinations, in particular the first and/or a third angle determination, is performed according to a MIMO transmission scheme (multiple-input multiple-output) and/or MIMO processing. In addition, one of the angle determinations, in particular the second angle determination, can take place according to a SIMO transmission scheme (single-input multiple-output) and/or SIMO processing. In so doing, the phase differences between the first and second radar signals can be evaluated in order to draw conclusions about the different transit times and thus the angles of arrival and reflection of the radar signals and finally also about the direction information, therefore, the direction of the target object relative to the radar system.

In a further possibility it can be provided that the following step is performed before carrying out the angle determinations: performing a processing of the detection information in order to determine a range (therefore the distance) and/or a relative velocity to the target object.

The processing can include at least one or preferably two Fourier transforms of the respective detection information. Specifically, two-dimensional Fourier transforms can be performed for all detection information in order to obtain information about the range of the target object and the relative velocity of the target object.

The transmit antennas can also be designated with Tx (the x stands for the index of the transmit antenna, therefore the first, second, etc.), and the receive antennas correspondingly with Rx. Each detection information can correspond to a different Tx-Rx combination, therefore, result from a received radar signal (i.e., receive signal) from a certain receive antenna Rx, and be specific for the transmitted signal from a certain transmit antenna Tx. In other words, the transmitted and reflected radar signal of each transmit antenna can be received by each receive antenna, so that each of the receive signals are assigned to the receive antenna from which it was received and to the transmit antenna from which it was transmitted. A detection information can then be formed from each of these receive signals from different transmit and receive antennas.

The detection information can be digital information, which is obtained, for example, by means of an analog-to-digital conversion. In this way, the processing of the detection information can be performed by an electronic processing device for data processing of the radar system.

The first detection information results in particular from received radar signals transmitted by the first transmit antenna and are therefore specific for the first transmit antenna and the first radar signal. The second detection information results in particular from received radar signals transmitted by the second transmit antenna and are therefore specific for the second transmit antenna and the second radar signal. In addition, the detection information can be divided into information resulting from a received radar signal that was received by the first receive antenna and into information resulting from a received radar signal that was received by the second, third receive antenna, etc. These combinations thus result in M·K detection information, which can be converted by the Fourier transform into a spectrum, also referred to as a range-Doppler map or an RV image (range-velocity). The spectra can then be averaged and local maxima can be searched for therein that lie above a detection threshold. In this way, the relevant reflections can be determined. The (first and/or third) angle determination can then take place using MIMO and an evaluation of the phases and amplitudes can be performed in order to determine the direction information. MIMO in this case uses multiple Tx and Rx transmit and receive antennas to build a virtual antenna layout therefrom. The respective transmitted radar signal can have multiple frequency-modulated ramps (chirps) of the duration $T_C$ and bandwidth B. In this regard, during a measurement period $T_M$ N ramps can be output per transmit antenna Tx as the respective radar signal. The radar signals can thus each be implemented as electromagnetic waves.

It can preferably be provided that a compensation value for the first and/or third angle determination is determined from the determined (i.e., measured) relative velocity. The transit time differences between the transmit antennas, just like the transit time differences between the receive antennas, lead to phase differences that correspond to the angle of reflection or arrival. However, the time multiplex of the transmit antennas also leads to an influencing of the phase difference, therefore, to a deviation in the type of a phase shift as a function of the target velocity (i.e., relative velocity) of the target object. Nevertheless, the phase shift can be compensated using the following formula (also referred to as velocity compensation):

$$\Delta\varphi = 2kT_C v.$$

Here k is the wave number of the radar signal and v the (measured) target velocity. $\Delta\varphi$ can be the compensation value that is used to compensate for the phase shift in the angle determination. In the simplest case, for this purpose, the value $\Delta\varphi$ can be added to the existing phase differences in the detection information (or the spectrum resulting therefrom).

It can be provided that the ambiguity is in the form of an ambiguity in the determined relative velocity and leads to a phase error in the compensation value. Thus, it can be problematic that the maximum representable relative velocity in the RV image is $$v_{max} = \frac{N}{2} \cdot \Delta v, \; \Delta v = \frac{\lambda}{2T_M},$$

with the velocity resolution $\Delta v$. Higher velocities fold over, so that the following applies to the measured relative velocity:

$$v_{meas} = \mathrm{mod}(v + v_{max}, 2 \cdot v_{max}) - v_{max}.$$

Ambiguous relative velocities thus lead to a phase error $$\Delta\varphi_e = \Delta\varphi - \Delta\varphi_{meas} = 2kT_C(v_{meas} + n \cdot 2v_{max}) - 2kT_C v_{meas} =$$

$$4nkT_C v_{max} = \frac{4nkT_C N\lambda}{4T_M} = \frac{nkT_C N\pi}{NT_C k} = n\pi.$$

Nevertheless, this ambiguity can initially be tolerated, because a complex approximation of the actual relative velocity can only take place in subsequent processing steps. In order to still be able to correctly determine the direction information, a correction value can already be used, which is $\pi$ for odd folding-over of the relative velocity and 0 otherwise. Because a velocity plausibility check in the radar evaluation can only take place after the angle determination, an ambiguous velocity measurement inevitably leads to an incorrect compensation of the phase shift by means of $\Delta\varphi$ and thus to an incorrect measurement angle (therefore, the direction information). According to the invention, the identification of a velocity ambiguity during the angle determination and a correction of the compensation based thereon can therefore be provided. The invention is based on the consideration that the velocity compensation must only take place in the MIMO case. If in contrast only one transmit antenna Tx is used, then compensation is not necessary. Therefore, the MIMO angle estimation, thus, e.g., the first and third angle determination, can be compared for an unambiguous and ambiguous velocity hypothesis with the angle determination by means of a Tx (SIMO angle estimation). The information on the velocity ambiguity can then be made available to subsequent modules of the radar system.

It can be possible furthermore that a or the correction value for the phase error is provided, the following step being provided: performing a third angle determination from the first and second detection information in order to determine a third angle information therefrom, wherein in contrast to the first angle determination, the correction value is used.

It may be possible for the first and third angle determination to process the first and second detection information, in particular to compare these with one another, in order to determine the first and third angle information. In contrast, the second angle determination can only use one of the (first or second) detection information and thus determine the second angle information without taking into account the detection information that is not used. The second angle information can thus only be specific for the radar signal of one of the transmit antennas, whereas the first and third angle information can be specific for the radar signal of both or all transmit antennas. However, the first and third angle determination can also be performed differently. Both can be based on MIMO processing. Velocity compensation may be necessary further for both angle determinations. Because the use of the correction value is necessary due to the ambiguity, the correction value=0, therefore, no correction value, can be used in the first angle determination, and the correction value, in particular, $\pi$ for the odd folding-over of the relative velocity can be used in the third angle determination. Both options are "tried" thereby.

Further, it is optionally provided that when performing the at least one comparison, the third angle information is additionally compared with the second angle information in order to determine a first deviation of the first and second angle information and a second deviation of the second and third angle information by the comparisons in order to determine the direction information as a function of the deviations. Subsequent to the angle determinations, the first and third angle information, resulting from the different corrections, can thus be compared with the second angle information in order to select the information that is closest to the second angle information from the first and third angle information for determining the direction information. In the case of the second angle information, the ambiguity cannot lead to an error, because no velocity compensation was performed for the second angle determination. It is therefore advantageous that the direction information is determined from the first angle information, if the first deviation is smaller than the second deviation, and it is otherwise determined from the third angle information.

A further advantage within the scope of the invention can be achieved if the transmission of the first radar signal over the first transmit antenna and the transmission of the second radar signal over the second transmit antenna are carried out alternately in time. Alternatively or in addition, it can be provided that the transmission of the first radar signal over the first transmit antenna and the transmission of the second radar signal over the second transmit antenna are carried out offset in time. This means in particular that the individual ramps of the radar signals are transmitted without overlap. It is thus possible to determine the detection information in such a way that it is specific for a certain radar signal from a certain transmit antenna and can thus be assigned to the transmit antenna.

It can preferably be provided that the first detection information is determined from the receive signals of the receive antennas such that the first detection information is specific for the first radar signal transmitted by the first transmit antenna of the radar system and/or reflected on the target object and/or delayed by a first transit time, wherein the first detection information (together) has a first phase difference as a function of a direction of the target object (relative to the radar system) and as a function of a distance of the receive antennas to one another, and/or that the second detection information is determined from the receive signals of the receive antennas such that the second detection information is specific for the second radar signal transmitted by the second transmit antenna of the radar system and/or reflected on the target object and/or delayed by a second transit time, wherein the second detection information (together) has a second phase difference as a function of the direction of the target object and the distance between the receive antennas, and/or that the first detection information has a third phase difference to the second detection information as a function of the direction of the target object and a distance of the transmit antennas to one another, so that the third phase difference can be specific for the angle of reflection of the radar signal from the transmit antennas, and the first and/or second phase difference can be specific for the angle of arrival of the radar signal at the receive antennas, and/or that the first and second phase difference has a phase deviation with respect to one another due to a relative velocity of the target object, wherein the phase deviation for determining the third phase difference can be compensated by measuring the relative velocity in order to carry out the first and/or third angle determination using the third phase difference. In this way, the advantages of a MIMO transmission scheme can be used very reliably.

In addition, it can be advantageous within the scope of the invention that the compensation of the phase deviation, therefore, the velocity compensation, takes place by means of a compensation value which is ambiguously defined by the measured relative velocity. The ambiguity can be due to the limited resolution and thus to the limited measurement range for the relative velocity.

It is conceivable further within the scope of the invention that the at least two receive antennas are designed as at least four or at least six receive antennas. It is also possible, if necessary, for further receive antennas to be provided. This can increase the performance of the radar system.

It is also conceivable that the first, and in particular third, angle determination is carried out using a MIMO method and the second angle determination is carried out using a SIMO method.

The object of the invention is also a radar system for a vehicle, for example, a passenger vehicle or truck. The radar system can have an (in particular electronic) processing device in order to perform the steps of a method of the invention. Thus, the radar system of the invention provides the same advantages as have been described in detail with reference to a method of the invention. It is possible for the radar system to be designed as a continuous-wave radar, in particular an FMCW radar.

The object of the invention also is a computer program comprising commands which, when executed by a processing device, in particular of the method of the invention, cause it to execute the steps of a method of the invention. Thus, the computer program of the invention provides the same advantages as have been described in detail with reference to a radar system and/or method of the invention. The processing device can have, e.g., at least one processor which reads the computer program out of a memory in order to execute it.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
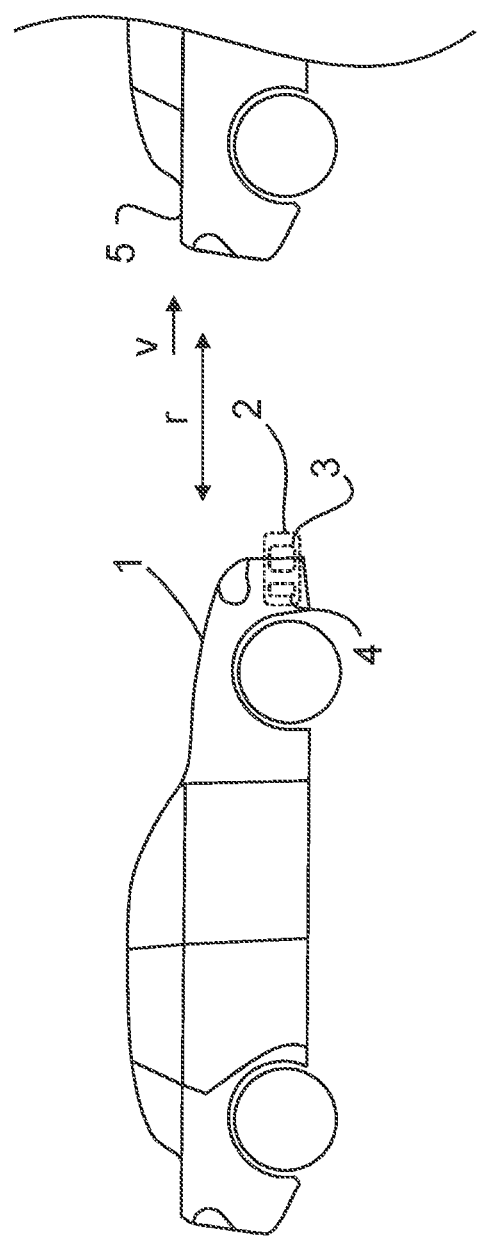
FIG. 1 is a schematic diagram of parts of a radar system of the invention.
Figure 2:
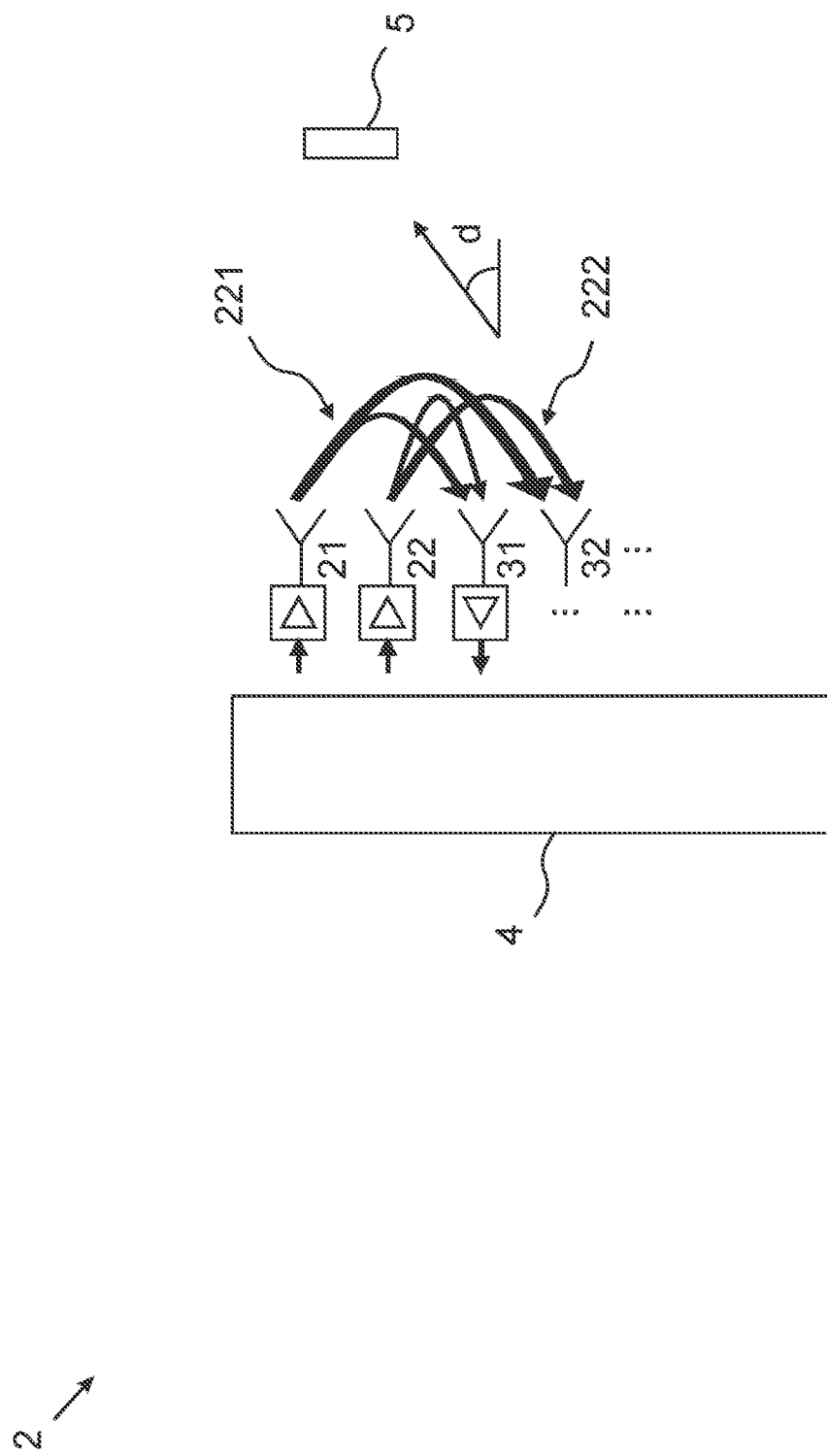
FIG. 2 is a schematic diagram of parts of a radar system of the invention.

In FIG. 1 a radar system 2 for a vehicle 1 is shown which has a processing device 4 in order to perform the steps of a method of the invention. Radar system 2 can comprise at least one radar sensor 3, which in turn has at least two transmit antennas 21, 22 and at least two receive antennas 31, 32 (see FIG. 2). Further, radar system 2 can serve to perform a determination of direction information for at least one target object 5 by means of the method of the invention. Target object 5 is located outside vehicle 1 and has a direction d, a range r, and a velocity v relative to it. The determination of these parameters r, v, and d is shown in FIG. 2 with further details. According to a first method step, in this regard, first detection information 201 can be provided by the at least two receive antennas 31, 32 of radar system 2, wherein first detection information 201 is specific for a first radar signal 221 transmitted by a first transmit antenna 21 of radar system 2, reflected on target object 5, and delayed by a transit time. According to a second method step, in addition, second detection information 202 can be provided by the at least two receive antennas 31, 32 of radar system 2, wherein second detection information 202 is specific for a second radar signal 222 transmitted by a second transmit antenna 22 of radar system 2, reflected on target object 5, and delayed by a transit time. Detection information 201, 202 can be determined in this case as digital information from the signals received by receive antennas 31, 32 by processing device 4.

Figure 3:
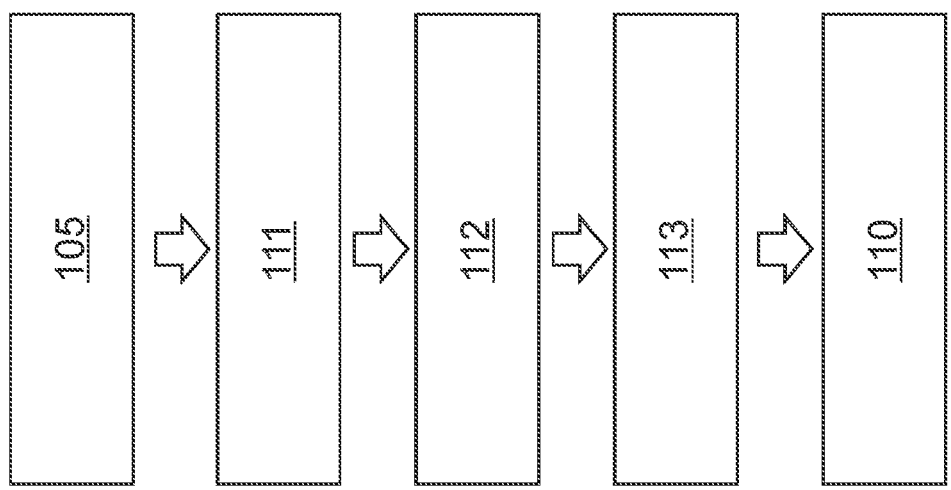
FIG. 3 is a schematic visualization of a method of the invention.

According to FIG. 3, the aforementioned parameters r, v, and d can be determined by the subsequent processing 105 of detection information 201, 202. A first angle determination 111 can then be performed from the first and second detection information 201, 202 in order to determine first angle information 231 therefrom, so that first angle information 231 is specific for first and second radar signal 221, 222 (and thereby for both transmit antennas 21, 22). Subsequently, a second angle determination 112 can be performed from the first or second detection information 201, 202 in order to determine a second angle information 232 therefrom, so that second angle information 232 is specific (only) for one of the radar signals 221, 222 or (only) for one of the transmit antennas 21, 22. A third angle determination 113 can then also be carried out from the first and second detection information 201, 202 in order to determine third angle information 233, so that third angle information 233 is specific for first and second radar signal 221, 222 (and thereby for both transmit antennas 21, 22). First and third angle determination 111, 113 can thus be performed in the same way. At least one comparison 110 of first angle information 231 with second angle information 232 can then be performed in order to detect an ambiguity in first angle determination 111 for the determination of the direction information.

Figure 4:
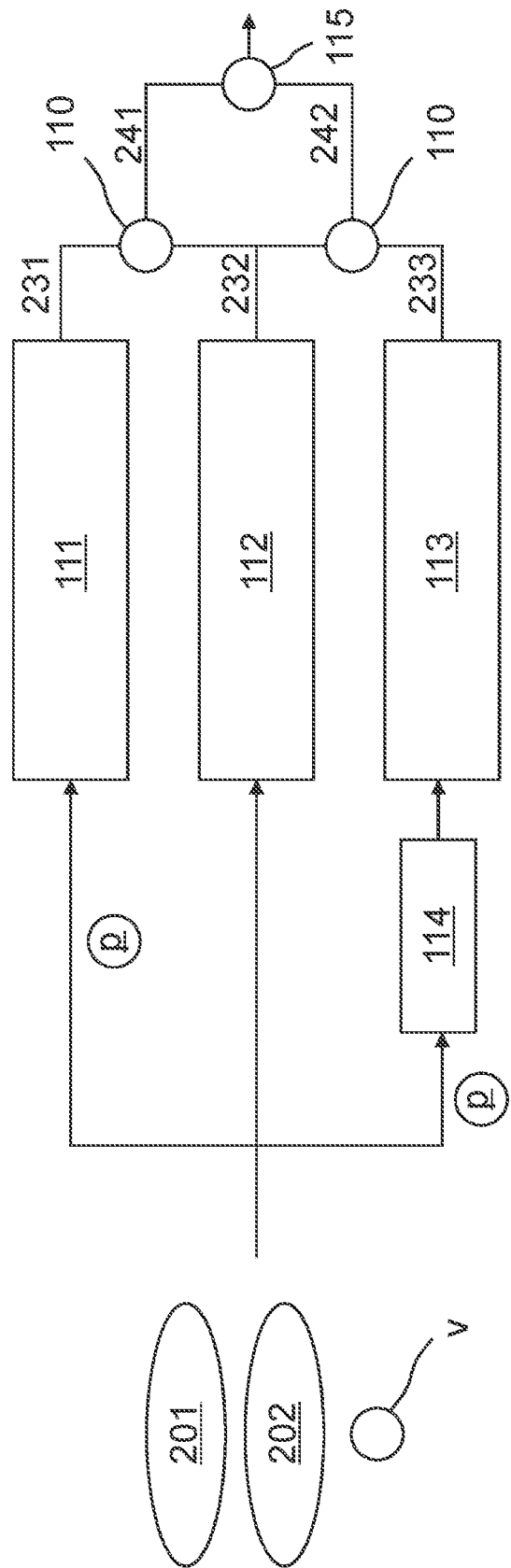
FIG. 4 is a schematic diagram of the method steps.

This procedure is visualized in FIG. 4 with further details. A compensation value p for the first and third angle determination 111, 113 can thus be determined from the determined parameter v, therefore, the determined relative velocity v. Because the ambiguity can be in the form of an ambiguity of the determined relative velocity v, this can further lead to a phase error in the compensation value p. A correction value for the phase error can therefore be provided and taken into account in step 114. Third angle determination 113 can then take place from the first and second detection information 201, 202 in order to determine third angle information 233 therefrom, wherein the correction value is used in contrast to first angle determination 111. The background here is that there are two possible correction values (0 and π), wherein only one of the correction values can be the correct one. Different correction values of these correction values are thus used in the first and third angle determination 111, 113. Then, when performing the at least one comparison 110, third angle information 233 can be compared additionally with second angle information 232 in order to determine a first deviation 241 of the first and second angle information 231, 232 and a second deviation 242 of the second and third angle information 232, 233 based on the comparisons 110. In this way, the direction information can be determined as a function of deviations 241, 242. According to decision step 115, the direction information can be determined from first angle information 231, if first deviation 241 is smaller than second deviation 242, and it is otherwise determined from third angle information 233.

Figure 5:
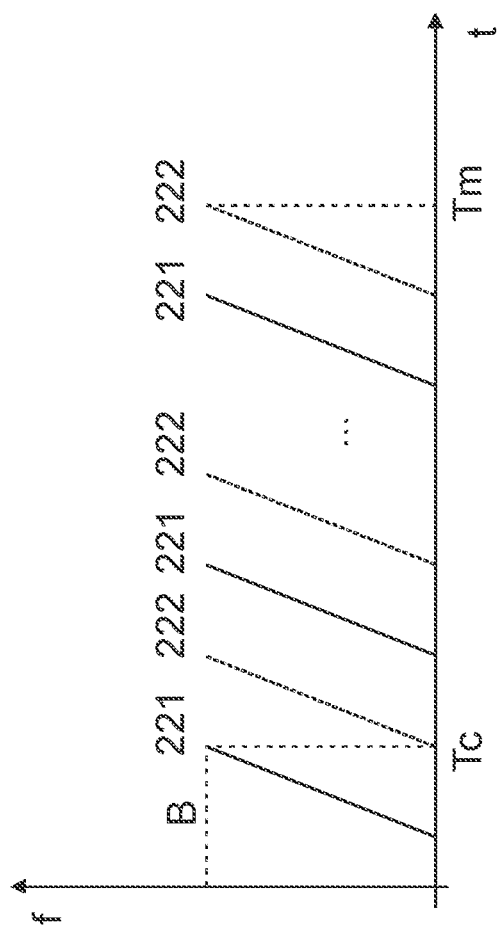
FIG. 5 is a diagram of a transmission scheme of the method of the invention.

In FIG. 5, the transmission of radar signals 221, 222 over the time t and with the schematic representation of the frequency f is shown by way of example. It can be seen that the particular transmitted radar signal 221, 222 can have rapid ramps (chirps) of the duration $T_C$ and bandwidth B. In this regard, during a measurement period $T_M$ N ramps can be output per transmit antenna 21, 22.

Reference characters 221 and 222 above the ramps each indicate the assignment of the ramps to the radar signals 221, 222. The ramps with a solid line are thus assigned to first radar signal 221 and the ramps with a dashed line are assigned to second radar signal 222. Radar signals 221, 222 are thus transmitted over the various transmit antennas 21, 22 within the measurement time $T_M$ offset in time and alternating.

The respective detection information 201, 202 can be assembled after measurement time $T_M$ from the received signals of receive antennas 31, 32. Further, processing 105 of detection information 201, 202 can take place after measurement time $T_M$. According to the MIMO transmission scheme, M Tx transmit antennas can be operated in time-division multiplex, and K Rx receive antennas are sampled on the receive side. Detection information 201, 202 can be formed from the sampled signal received at receive antennas 31, 32.

The above explanation of the embodiments describes the present invention solely in the context of examples. Of course, individual features of the embodiments can be freely combined with one another, if technically feasible, without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining direction information for at least one target object in a radar system for a vehicle, the method comprising:
providing the first detection information by at least two receive antennas of the radar system, the first detection information being specific for a first radar signal transmitted by a first transmit antenna of the radar system;
providing second detection information by the at least two receive antennas of the radar system, the second detection information being specific for a second radar signal transmitted by a second transmit antenna of the radar system;
performing a first angle determination from the first and second detection information to determine a first angle information therefrom, so that the first angle information is specific for the first and second radar signal;
performing a second angle determination from the first or second detection information to determine a second angle information therefrom, so that the second angle information is specific for one of the radar signals;
performing a processing of the detection information, before carrying out the first and second angle determinations, to determine a distance range and the relative velocity to the target object; and
performing at least one comparison of the first angle information with the second angle information to detect an ambiguity in the first angle determination for the determination of the direction information,
wherein the ambiguity is in the form of an ambiguity in a determined relative velocity.

2. The method according to claim 1, wherein a compensation value is determined for the first angle determination from the determined relative velocity.

3. The method according to claim 2, wherein the ambiguity leads to a phase error in the compensation value.

4. The method according to claim 3, further comprising:
providing a correction value for the phase error; and
performing a third angle determination from the first and second detection information to determine a third angle information therefrom, wherein in contrast to the first angle determination, the correction value is used.

5. The method according to claim 4, wherein, when performing the at least one comparison, the third angle information is additionally compared with the second angle information in order to determine a first deviation of the first and second angle information and a second deviation of the second and third angle information by the comparisons in order to determine the direction information as a function of the deviations.

6. The method according to claim 5, wherein the direction information is determined from the first angle information, if the first deviation is smaller than the second deviation and is otherwise determined from the third angle information.

7. The method according to claim 1, wherein the transmission of the first radar signal over the first transmit antenna and the transmission of the second radar signal over the second transmit antenna are carried out alternately in time.

8. The method according to claim 1, wherein the transmission of the first radar signal over the first transmit antenna and the transmission of the second radar signal over the second transmit antenna are carried out offset in time.

9. The method according to claim 1, wherein the first detection information is determined from the receive signals of the receive antennas such that the first detection information is specific for the first radar signal transmitted by the first transmit antenna of the radar system, reflected on the target object, and delayed by a first transit time, wherein the first detection information has a first phase difference as a function of a direction of the target object and as a function of a distance of the receive antennas to one another, and wherein the second detection information is determined from the receive signals of the receive antennas such that the second detection information is specific for the second radar signal transmitted by the second transmit antenna of the radar system reflected on the target object and delayed by a second transit time, wherein the second detection information has a second phase difference as a function of the direction of the target object and the distance between the receive antennas, and wherein the first detection information has a third phase difference to the second detection information as a function of the direction of the target object and a distance of the transmit antennas to one another, and wherein the first and second phase difference has a phase deviation with respect to one another due to a relative velocity of the target object, which deviation for determining the third phase difference is compensated by measuring the relative velocity in order to carry out the first angle determination using the third phase difference.

10. The method according to claim 9, wherein the compensation of the phase deviation takes place by a compensation value which is defined by the measured relative velocity.

11. The method according to claim 1, wherein the at least two receive antennas are designed as at least four receive antennas.

12. A radar system for a vehicle comprising an electronic processing device configured to perform the steps of the method according to claim 1.

13. A non-transitory computer-readable storage medium storing computer program comprising commands which, when executed by a processing device of a radar system, execute the steps of the method according to claim 1.

14. The method according to claim 1, wherein individual ramps of the first radar signal and the second radar signal are transmitted without overlap.

15. A method for determining direction information for a target object in a radar system for a vehicle, the method comprising:
providing a first detection information by at least two receive antennas of the radar system, the first detection information being specific for a first radar signal transmitted by a first transmit antenna of the radar system;
providing second detection information by the at least two receive antennas of the radar system, the second detection information being specific for a second radar signal transmitted by a second transmit antenna of the radar system;

performing a first angle determination from the first and second detection information to determine a first angle information therefrom, so that the first angle information is specific for the first and second radar signal; and performing a second angle determination from the first or second detection information to determine a second angle information therefrom, so that the second angle information is specific for one of the radar signals, wherein the first angle determination is carried out using a MIMO method and the second angle determination is carried out using a SIMO method.

16. A method for determining direction information for at least one target object in a radar system for a vehicle, the method comprising:

providing the first detection information by at least two receive antennas of the radar system, the first detection information being specific for a first radar signal transmitted by a first transmit antenna of the radar system;

providing second detection information by the at feast two receive antennas of the radar system, the second detection information being specific for a second radar signal transmitted by a second transmit antenna of the radar system;

performing a first angle determination from the first and second detection information to determine a first angle information therefrom, so that the first angle information is specific for the first and second radar signal;

performing a second angle determination from the first or second detection information to determine a second angle information therefrom, so that the second angle information is specific for one of the radar signals;

performing a third angle determination from the first and second detection information to determine a third angle information therefrom; and performing at least one comparison of the first angle information with the second angle information to detect an ambiguity in the first angle determination for the determination of the direction information, wherein the first angle determination and the third angle determination are carried out using a MIMO method and the second angle determination is carried out using a SIMO method.

17. A method for determining direction information for at least one target object in a radar system for a vehicle, the method comprising:

providing the first detection information by at least two receive antennas of the radar system, the first detection information being specific for a first radar signal transmitted by a first transmit antenna of the radar system;

providing second detection information by the at least two receive antennas of the radar system, the second detection information being specific for a second radar signal transmitted by a second transmit antenna of the radar system;

performing a first angle determination from the first and second detection information to determine a first angle information therefrom, so that the first angle information is specific for the first and second radar signal;

performing a second angle determination from the first or second detection information to determine a second angle information therefrom, so that the second angle information is specific for one of the radar signals; and performing at least one comparison of the first angle information with the second angle information to detect an ambiguity in the first angle determination for the determination of the direction information, wherein the first angle determination is carried out using a MIMO method and the second angle determination is carried out using a SIMO method.

* * * * *